(12) United States Patent
Hartman

(10) Patent No.: US 7,192,230 B2
(45) Date of Patent: Mar. 20, 2007

(54) SYSTEM, APPARATUS AND METHOD FOR DECOUPLING A RAILCAR RESTRAINT

(75) Inventor: Jerry Franklin Hartman, Denton, NC (US)

(73) Assignee: Lowe's Companies, Inc., Morresville, NC (US)

( * ) Notice: Subject to any disclaimer, the term of this patent is extended or adjusted under 35 U.S.C. 154(b) by 0 days.

(21) Appl. No.: 11/087,726

(22) Filed: Mar. 23, 2005

(65) Prior Publication Data

US 2006/0216128 A1    Sep. 28, 2006

(51) Int. Cl.
B25J 1/00 (2006.01)
(52) U.S. Cl. ........................................ 410/98
(58) Field of Classification Search ............... 410/98; 16/110.1, 114.1; 414/1, 7, 14, 373
See application file for complete search history.

(56) References Cited

U.S. PATENT DOCUMENTS

| | | | |
|---|---|---|---|
| 3,888,535 A * | 6/1975 | Rosso | 294/19.1 |
| 5,145,299 A | 9/1992 | Stephenson, Jr. | |
| 5,186,586 A | 2/1993 | Stephenson, Jr. | |
| 5,221,044 A | 6/1993 | Guins | |
| 5,315,724 A * | 5/1994 | Trujillo et al. | 7/145 |
| 5,425,154 A | 6/1995 | Edwards, Jr. | |
| 5,810,408 A * | 9/1998 | Armstrong | 294/57 |
| 6,089,802 A | 7/2000 | Bullock | |
| 6,199,245 B1 * | 3/2001 | Blessing | 16/430 |
| 6,200,079 B1 | 3/2001 | Little | |
| 6,227,779 B1 | 5/2001 | Bullock | |
| 6,367,121 B1 * | 4/2002 | MacMillan | 16/110.1 |
| 6,494,651 B1 | 12/2002 | Zhan et al. | |
| 6,517,008 B1 | 2/2003 | Remington et al. | |
| 6,568,601 B2 | 5/2003 | Maynard | |
| 6,585,466 B2 | 7/2003 | Zhan et al. | |
| 6,607,337 B1 | 8/2003 | Bullock | |
| 6,709,209 B2 | 3/2004 | Zhan et al. | |
| 6,749,382 B2 * | 6/2004 | Lambie | 410/97 |
| 6,798,348 B1 * | 9/2004 | Wilker et al. | 340/691.1 |
| 6,820,906 B1 | 11/2004 | McClendon | |
| 6,824,339 B1 * | 11/2004 | Childers | 410/103 |
| 2001/0036390 A1 | 11/2001 | Zhan et al. | |
| 2001/0038778 A1 | 11/2001 | Tatina | |
| 2002/0179368 A1 | 12/2002 | Evangelista | |

(Continued)

FOREIGN PATENT DOCUMENTS

GB    2177471 A    1/1987

OTHER PUBLICATIONS

International Search Report for International Application No. PCT/US2006/008111 completed Jun. 7, 2006, and mailed Jun. 16, 2006.

(Continued)

*Primary Examiner*—H Gutman
(74) *Attorney, Agent, or Firm*—Alston & Bird LLP

(57) ABSTRACT

A system for decoupling a restraint from a railcar is provided. According to one embodiment, the system comprises a lifting device and a decoupler apparatus. The lifting device is structured to position the decoupler apparatus adjacent to the restraint. The decoupler apparatus includes an elongate member and a decoupling member attached to the elongate member. The decoupling member is structured to decouple the restraint from the railcar.

20 Claims, 6 Drawing Sheets

U.S. PATENT DOCUMENTS

| | | |
|---|---|---|
| 2002/0194784 A1 | 12/2002 | Stojc et al. |
| 2002/0197127 A1 | 12/2002 | Zhan et al. |
| 2003/0002949 A1 | 1/2003 | Coslovi et al. |
| 2003/0042323 A1 | 3/2003 | Maynard |
| 2003/0129039 A1 | 7/2003 | Zhan et al. |
| 2003/0136295 A1 | 7/2003 | Goldbeck |
| 2003/0194286 A1 | 10/2003 | Coslovi et al. |

OTHER PUBLICATIONS

Written Opinion of the International Searching Authority for International Application No. PCT/US2006/008111.

* cited by examiner

SYSTEM, APPARATUS AND METHOD FOR DECOUPLING A RAILCAR RESTRAINT

FIELD OF THE INVENTION

The present invention is related to freight transportation and, more particularly, to a system, apparatus and method for decoupling a restraint from a railcar.

BACKGROUND OF THE INVENTION

Materials, product, and other freight loaded onto railcars are typically secured to the railcar using a restraint system. As illustrated in FIGS. 6A–6C and 7, a conventional restraint system 10 includes a number of cables 12 that extend from a series of winches (not shown) secured to the bottom of the railcar 14 to a joist 16 that extends lengthwise along the top of the railcar. Each cable includes a loop 18 formed at one end using a pressure fitted fastener 20, such as a crimp. The loop 18 attaches a short length of chain 22 to the end of the cable 12. The joists 16 include a series of slots 24 that receive and secure the chains 22 attached to the cables 12. Once each chain 22 is positioned within the respective slot 24, the corresponding winch is rotated to tighten the cable 12 thereby securing the freight to the railcar 14.

Once the railcar has been transported to its destination, the restraint system is released by loosening the winches and decoupling the chains from the slots in the joist. It is typically necessary for a worker to climb onto the joist to decouple the chains and, if necessary, dislodge the chains or cable with a hammer or similar tool. However, due to the height of the joist, it can be dangerous for workers to climb onto the joist, as a worker could fall and be injured. To minimize the potential risk associated with decoupling the chains from the joist, it is it has been proposed to construct a tethering system that includes safety lines that extend from a stationary support structure to the workers while they are on top of the joist. Unfortunately, these tethering systems are expensive to build. In addition, because the tethering systems require a stationary support structure to secure the safety lines, it is necessary to move each railcar that is to be unloaded to the tethering system, which is time consuming and increases the expense associated with unloading the railcars.

Thus, there remains a need for a system, apparatus and method for decoupling railcar restraints. The system, apparatus and method should allow the railcar restraints to be efficiently and cost-effectively decoupled from the railcars. In addition, the system, apparatus and method should alleviate the worker-safety issues associated with conventional methods of decoupling railcar restraints.

BRIEF SUMMARY OF THE INVENTION

The present invention provides an apparatus for decoupling a restraint from a railcar. According to one embodiment, the apparatus comprises an elongate member defining first and second ends and a decoupling member attached to the elongate member. The decoupling member is structured to decouple the restraint from the railcar. In one embodiment, the decoupling member is structured to support the restraint after the restraint is decoupled from the railcar. In another embodiment, the decoupling member is attached to the first end of the elongate member. In another embodiment, the apparatus comprises a handle attached to the second end of the elongate member. In another embodiment, the decoupling member comprises a base portion structured to capture the restraint and to decouple the restraint from the railcar. In still another embodiment, the base portion has a generally C-shaped configuration. In yet another embodiment, the decoupling member comprises a support portion being structured to support the restraint once the restraint is decoupled from the railcar.

The present invention also provides a system for decoupling a restraint from a railcar. In one embodiment, the system includes a decoupler apparatus and a lifting device. The lifting device being structured to position the decoupler apparatus adjacent to the restraint.

The present invention also provides a method for decoupling a restraint from a railcar. According to one embodiment, the method includes providing a decoupler apparatus having an elongate member and a decoupling member attached thereto. The decoupling member is positioned adjacent the restraint. In one embodiment, the positioning step comprises positioning a lifting device adjacent the railcar and then lifting the decoupler apparatus using the lifting device. In another embodiment, the positioning step comprises moving the lifting device along the side of the railcar. In still another embodiment, the positioning step comprises capturing at least a portion of the restraint with a base portion of the decoupling member. The method includes decoupling the restraint from the railcar using the decoupling member of the decoupler apparatus. In one embodiment, the decoupling step includes thrusting a base portion of the decoupling member against at least a portion of the restraint. In another embodiment, the decoupling step includes supporting the restraint with a support portion of the decoupling member.

Thus, there is provided a system, apparatus and associated method for decoupling railcar restraints. The system, apparatus and method should allow the railcar restraints to be efficiently and cost-effectively decoupled from the railcars. In addition, the system, apparatus and method alleviates worker-safety issues associated with conventional methods of decoupling railcar restraints.

BRIEF DESCRIPTION OF THE DRAWINGS

Figure 1:
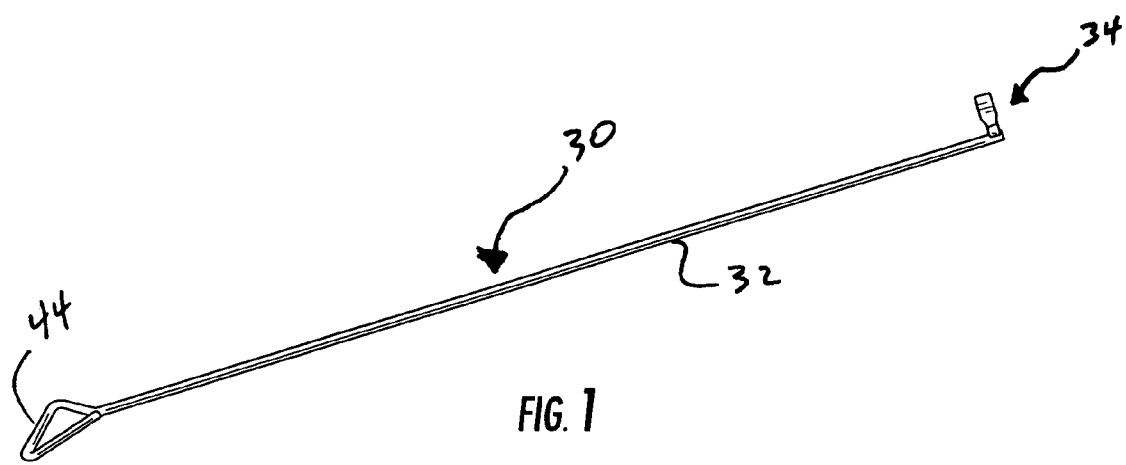
Figure 2:
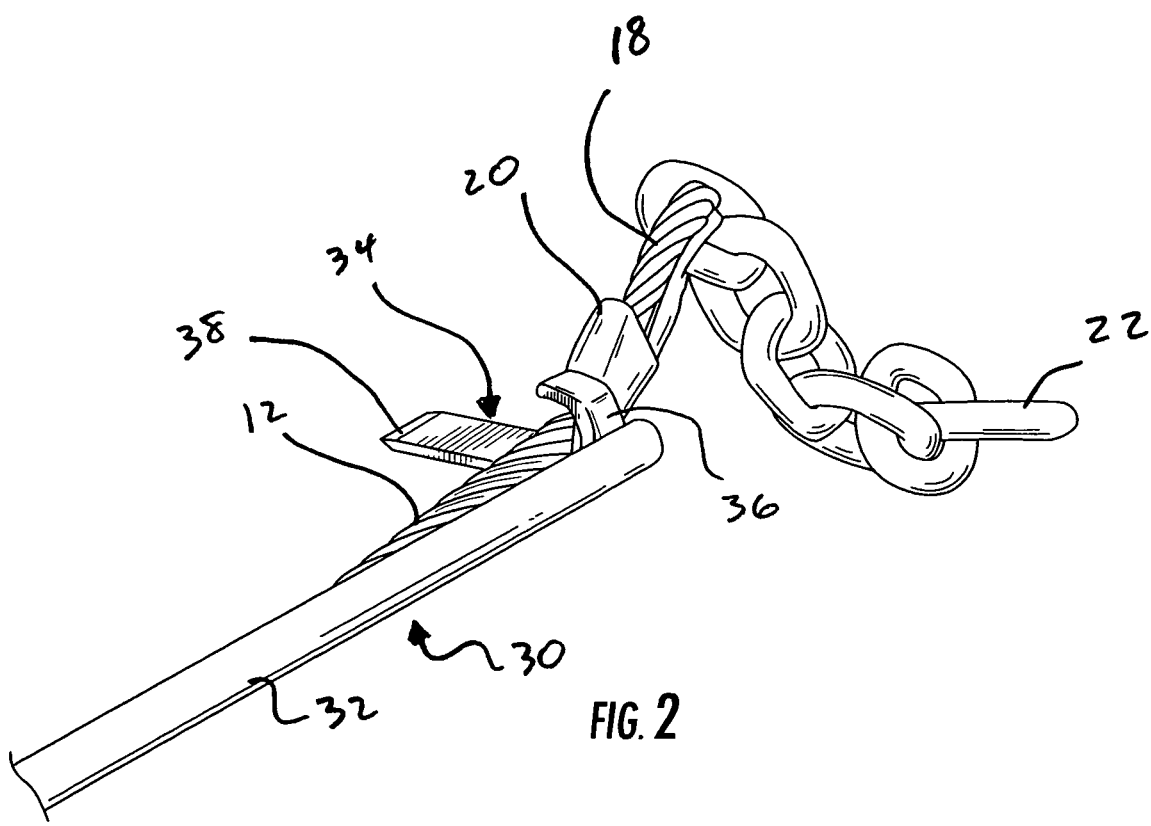
Figure 3:
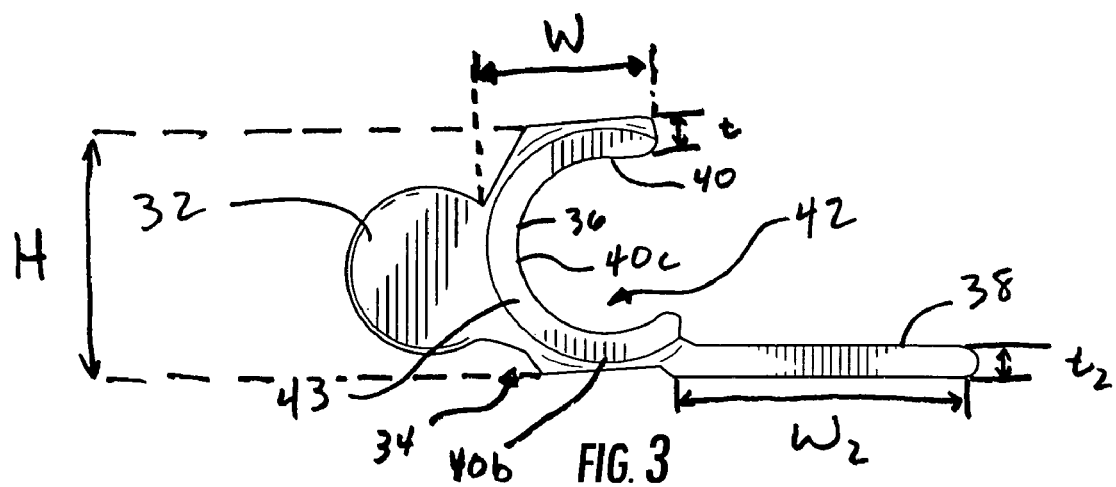
Figure 4:
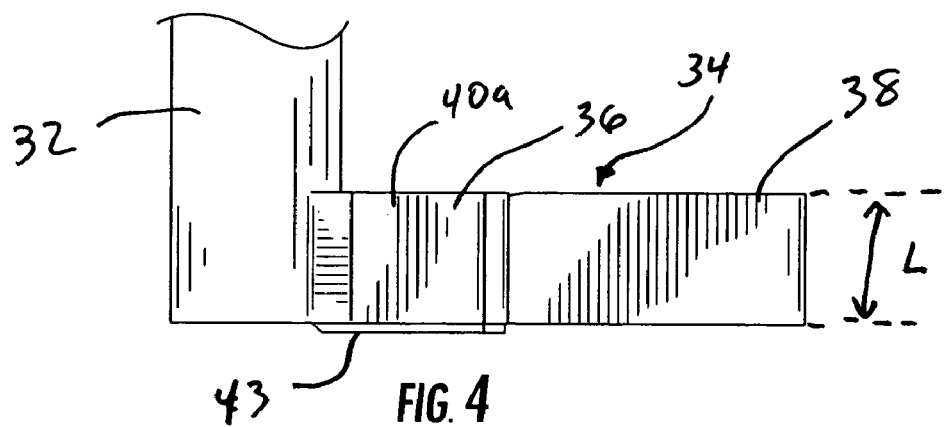
Figure 5:
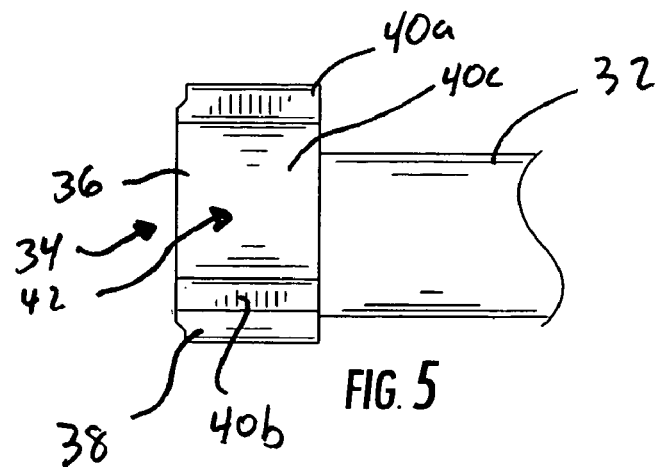
Figure 6A:
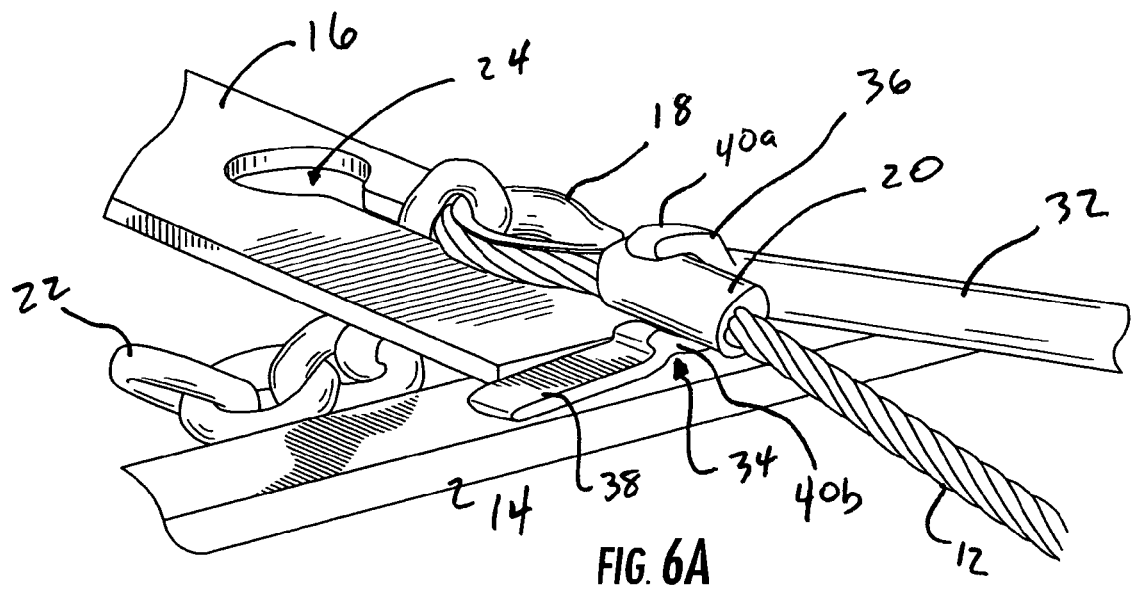
Figure 6B:
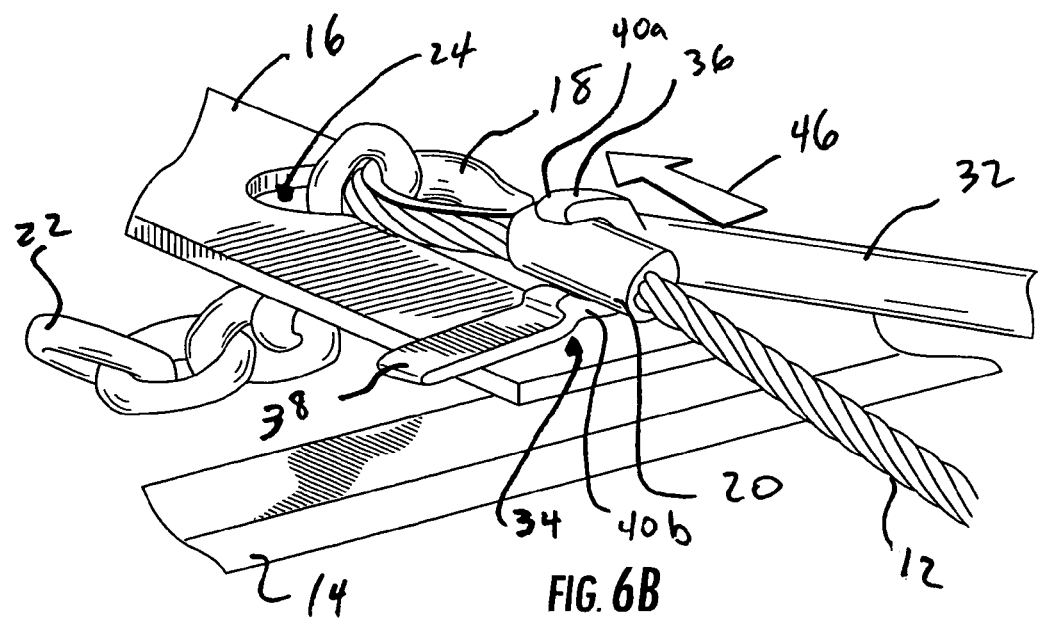
Figure 6C:
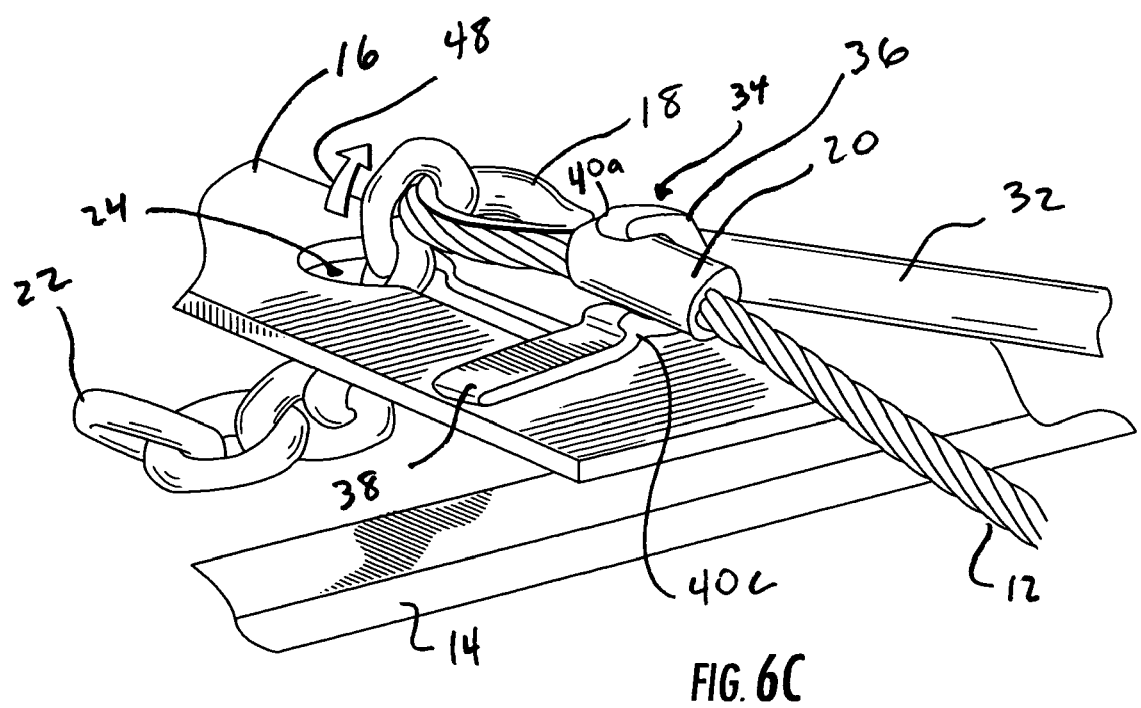
Figure 7:
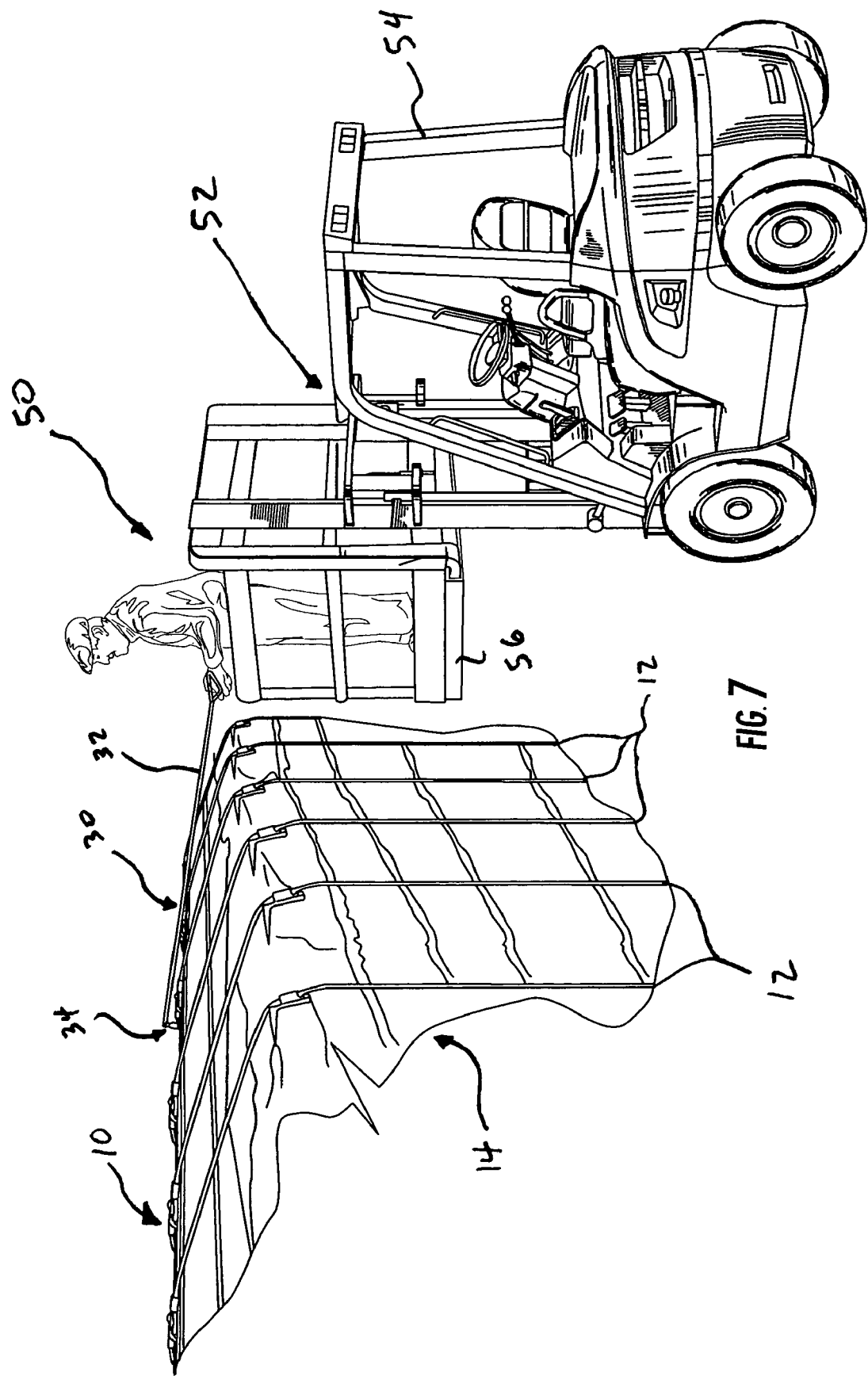

Having thus described the invention in general terms, reference will now be made to the accompanying drawings, which are not necessarily drawn to scale, and wherein:

FIG. 1 is a perspective view illustrating an apparatus for decoupling railcar restraints, according to one embodiment of the present invention;

FIG. 2 is a partial perspective view illustrating the decoupling end of the decoupler apparatus of FIG. 1 and a railcar restraint, according to one embodiment of the present invention;

FIG. 3 is a front view illustrating the decoupling end of FIG. 2;

FIG. 4 is a top view illustrating the decoupling end of FIG. 2;

FIG. 5 is a side view illustrating the decoupling end of FIG. 2;

FIG. 6A is a partial perspective view illustrating the decoupling end of the decoupler apparatus of FIG. 1 being positioned to operably engage a railcar restraint, according to one embodiment of the present invention;

FIG. 6B is a partial perspective view illustrating the decoupling end of FIG. 6A operably engaging a railcar restraint;

FIG. 6C is a perspective view illustrating the decoupling end of FIG. 6B decoupling the railcar restraint; and FIG. 7 is a partial perspective view illustrating a system for decoupling a railcar, according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, there is illustrated an apparatus 30 for decoupling a railcar restraint 10, according to one embodiment of the present invention. The decoupler apparatus 30 includes an elongate member 32 and a decoupling member 34. The elongate member 32 can comprise a rod or tubular member. The elongate member 32 preferably is formed of metal, but can be formed using other materials, such as plastic or wood, provided the materials have sufficient strength and rigidity to support the weight of the restraint 10 (i.e., the weight of the cable 12, fastener 20, and chain 22) after it is decoupled from the joist 16. In one embodiment, the elongate member 32 is formed from 9/16 inch metal rod. The length of the elongate member 32 can vary depending on the width of the railcar. According to one embodiment, the elongate member 32 has a length of approximately 66 inches. As illustrated in FIG. 1, the elongate member 32 is substantially straight. According to other embodiments (not shown), the elongate member 32 can also have a curvilinear configuration or include one or more doglegs or bends.

The decoupler apparatus 30 includes a decoupling member 34 at one end of the elongate member 32. In other embodiments (not shown), the location of the decoupling member 34 along the length of the elongate member 32 varies. The decoupling member 34 is structured to decouple the chain 22 of the restraint 10 from the slot 24 in the corresponding joist 16 and to support the restraint (i.e., the cable 12, fastener 20, and chain 22) as the chain is removed from the slot. Referring to FIGS. 6A–6C, the slot 24 typically has a keyhole configuration including a circular section 24a and an elongate section 24b. The elongate section 24b has a width slightly larger than the thickness of a link in the chain 22. When securing the restraint 10 to the joist 16, the chain 22 is inserted partially through the circular section 24a of the slot 24 and then one link of the chain 22 is slid into the elongate section 24b of the slot. Since adjacent links in the chain 22 are oriented at 90° relative to one another, the links adjacent to the one slid into the elongate section 24b of the slot 24 are too wide to pass through the elongate section so that the chain is secured within the slot and, thus, the restraint 10 is secured to the joist 16.

Referring to FIGS. 2–5, the decoupling member 34 includes a base portion 36 and a support portion 38. As illustrated in FIG. 3, the base portion 36 comprises first and second flanges 40a, b and a lateral section 40c extending therebetween defining a generally C-shaped configuration that defines a channel 42 that is structured to allow the user to "capture" the loop 18, fastener 20, and/or chain 22 of the restraint 10. The base portion 36 comprises a forward side 43 that is structured to be thrust against the loop 18, fastener 20, and/or chain 22 to dislodge the chain from the elongate section 24b of the slot 24. In one embodiment, the base portion 36 has a width W of approximately 5/8 inch, a height H of approximately 1 1/8 inches, a length L of approximately 3/4 inch, and a thickness t of approximately 3/16 inch. Since the user must sometimes thrust the forward side 43 of the base portion 36 against the loop 18, fastener 20 and/or chain 22 of the restraint 10 one or more times to dislodge the chain from the elongate section 24b of the slot 24, the base portion preferably is constructed of metal or another material having sufficient mass, strength and rigidity to enable the user to apply sufficient force against the loop 18, fastener 20 and/or chain 22 of the restraint 10 without bending or otherwise damaging the base portion. In one embodiment, the base portion 36 is constructed of steel. The configuration and dimensions of the base portion 36 can vary provided the base portion enables the user to capture the fastener 20 and/or chain 22 of the restraint 10 and then to dislodge the chain from the elongate section 24b of the slot 24. For example, the base portion 36 can comprise other configurations, such as a generally U-shaped or V-shaped configuration.

The support portion 38 comprises a flange attached to and extending from one of the flanges 40a,b of the base portion 36. The support portion 38 of the decoupling member 34 is structured to support the restraint 10 (i.e., the cable 12, fastener 20, and chain 22) as the chain is removed from the circular section 24a of the slot 24a after the chain has been dislodged from the elongate section 24b of the slot. In one embodiment, the support portion 38 has a width $W_2$ of approximately 1 inch, a length L of approximately 1 1/2 inch, and a thickness $t_2$ of approximately 1/8 inch. The support portion 38 preferably is constructed of metal or another material having sufficient strength and rigidity to support the weight of the restraint 10 (i.e., the weight of the cable 12, fastener 20, and chain 22) without bending or otherwise damaging the support portion. In one embodiment, the support portion 38 is constructed of steel. The configuration and dimensions of the support portion 38 can vary provided the support portion enables the user to lift the restraint 10 (i.e., the weight of the cable 12, fastener 20, and chain 22) so that the chain can be removed from the circular section 24a of the slot 24a. For example, the support portion 38 can include a concave configuration so as to facilitate supporting the restraint 10.

As noted above, the support portion 38 is attached to the base portion 36. According to one embodiment, the base portion 36 and support portion 38 of the decoupling member 34 are formed integrally together. In another embodiment, the support portion 38 is attached to the base portion 36 using welding or suitable fasteners. Depending on the method of attaching the support portion 38 to the base portion 36, the base portion and support portion of the decoupling member 34 can be constructed of the same or different materials. Similarly, the decoupling member 34 is attached to the elongate member 32, either by forming the decoupling member and elongate member integrally together or by welding or using suitable fasteners. Depending on the method of attaching the decoupling member 34 to the elongate member 32, the elongate member and decoupling member can be constructed of the same or different materials.

In other embodiments (not shown) of the present invention, the support portion 38 is separate from the base portion 36 of the decoupling member 34 (i.e., not part of the decoupling member). For example, the base portion 36 of the decoupling member 34 can be mounted to the end of the elongate member 32 while the support portion 38 comprises a separate component that is attached to the elongate member a predetermined distance from the base portion or is not included at all (in which case the base portion 36 must be configured to capture and support the restraint 10). In still other embodiments (not shown), one or more additional support portions may be mounted along the length of the elongate member 32 in addition to the support portion 38 of the decoupling member 34. In still another embodiment (not shown), the decoupling member 34 can have a support portion 38 extending from both the first and second flanges 40a,b of the base portion 36, such that the decoupler apparatus 30 can be used to support the restraint 10 from either side of the joist 16.

Referring to FIG. 1, the decoupler apparatus 30 may also include a handle 44 at the end of the elongate member 32 distal from the decoupling member 34. The handle 44 can be formed integrally with the elongate member 32, such as by forming a series of doglegs or sharp bends in the end of the elongate member, as illustrated in FIG. 1. Alternatively, the design of the handle 44 can vary depending on various ergonomic requirements, including the size, material, shape, surface, stiffness, etc., as is well known by one of ordinary skill in the art.

Referring to FIG. 7, there is illustrated a system 50 for decoupling the restraints 10 on a railcar 14. The system 50 includes a lifting device 52 that is capable of lifting a user to a height approximate to or slightly above the height of the joist 16 on the railcar 14 so that the user can view the joist and chain 22 of the restraint. In one embodiment, the lifting device 52 includes a forklift 54 and user platform 56 (including safety rails). The system 50 further includes a decoupler apparatus 30, as described above, structured to decouple the chain 22 of the restraint 10 from the slot 24 in each corresponding joist 16 and to support the restraint 10 (i.e., the cable 12, fastener 20, and chain 22) as the chain is removed from the slot.

According to one embodiment, as illustrated in FIGS. 6A–6C and 7, during use the lifting device 52 is positioned adjacent one end of the railcar 14 such that the user platform 56 is aligned with the cable 12 of the first restraint 10 on the railcar. The lifting device 52 preferably is oriented such that the path of movement of the lifting device will be parallel to the side of the railcar 14. The spacing between the lifting device 52 and the railcar 14 preferably is approximately 18 inches to approximately 24 inches. The user platform 56 (including the user with the decoupler apparatus 30) is then raised to a height approximate to or slightly above the height of the joist 16 on the railcar so that the user can view the restraint 10 (including the loop 18, fastener 20, and chain 22) and the slot 24 in the joist 16.

The user then uses the decoupler apparatus 30 to decouple the chain 22 from the slot 24 in the corresponding joist 16. According to one embodiment, as illustrated in FIGS. 6A–6B, the user extends the elongate member 32 of the decoupler apparatus 30 in the direction of the railcar 14 to position the decoupling member 34 adjacent to the loop 18, fastener 20, and/or chain 22 of the restraint 10. The user then captures the loop 18, fastener 20, and/or chain 22 of the restraint 10 with the base portion 36 of the decoupling member 34. For example, according to one embodiment, the base portion 36 defines a channel 42 that is used to capture the loop 18, fastener 20, and/or chain 22 of the restraint 10. Once the loop 18, fastener 20, and/or chain 22 of the restraint 10 are captured, the user thrusts the base portion 36 of the decoupling member 34 against the loop, fastener, and/or chain of the restraint (see arrow 46) to dislodge the chain from the elongate section 24b of the slot 24. If necessary, the user may have to repeat the step of thrusting the base portion 36 of the decoupling member 34 against the loop, fastener, and/or chain of the restraint (see arrow 46). In one embodiment, the base portion 36 comprises a forward side 43 that is structured to be thrust against the loop 18, fastener 20, and/or chain 22 to dislodge the chain from the elongate section 24b of the slot 24. The decoupler apparatus 30 preferably includes a handle 44 to assist the user in thrusting the base portion 36 of the decoupling member 34.

Once the chain 22 is dislodged from the elongate section 24b of the slot 24, the user then uses the decoupler apparatus 30 to lift the chain 22 through the circular section 24a of the slot 24. According to one embodiment, as illustrated in FIG. 6C, the user uses the support portion 38 of the decoupling member 34 to lift the chain 22 through the circular section 24a of the slot 24 (see arrow 48) to thereby complete the process of decoupling the restraint from the corresponding joist 16. The user can then move the restraint 10 (i.e., the cable 12, fastener 20, and chain 22) to the edge of the railcar 14 and then release the restraint so that it drops beside the railcar 14 where the restraint can be stored on the winch (not shown), as is known in the art.

Once the restraint 10 has been decoupled, the operator (not shown) of the lifting device 52 moves the lifting device 52 so that the user in the user platform 56 is positioned adjacent the next restraint 10 and the decoupling process is repeated, as described above until each of the restraints on the railcar 14 have been decoupled. Referring to FIG. 7, in a preferred embodiment, the lifting device 52 is moved in reverse down the side of the railcar 14 (i.e., in a direction whereby the forklift 54 passes each cable 12 prior to the user platform 56 being moved into position adjacent the corresponding cable) so that the restraints 10 can be decoupled and dropped to the ground by the user after the lifting device has passed each corresponding cable 12 thereby minimizing any risk that one of the cables could be snagged by, or otherwise entangled with, the lifting device 52. Once the restraints 10 on a side of the railcar have been decoupled, the lifting device can then be moved onto the next railcar, if several railcars are connected in series, or can be moved to the other side of the railcar to decouple the restraints on the other side. Alternatively, the system 50 can include two lifting devices 52, each assigned to decouple the restraints 10 on a corresponding side of the railcar(s) 14.

According to another embodiment of the present invention, the decoupler apparatus 30 and system 50 can also be used to position the chain 22 of a decoupled restraint 10 within the circular section 24a of the slot 24 of the railcar joist 16 and to assist in positioning a link of the chain in the elongate section 24b of the slot. The cable 12 can then be tightened by rotating the corresponding winch (not shown), thus coupling the restraint 10 to the joist 16.

Advantageously, the decoupler apparatus 30 and system 50 and associated method, as described above, enable the restraints 10 on a railcar 14 to be decoupled (and coupled, if desired) efficiently and cost-effectively. In this regard, the lifting device 52 allows the user and the decoupler apparatus 30 to be quickly and efficiently transported to various railcars 29 where restraints 10 are to be decoupled. Additionally, several users, lifting devices 50, and decoupler apparatuses 30 may be used simultaneously in order to decouple the restraints 10 from the joists 16 of several railcars 14 in a short period of time. In addition, the apparatus, system and method of the present invention alleviate the worker-safety issues associated with conventional methods of decoupling railcar restraints.

Many other modifications and embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for decoupling a restraint from a railcar, comprising:
  an elongate member having first and second ends and defining an axis therebetween; and
  a decoupling member attached to said elongate member, said decoupling member being structured to decouple the restraint from the railcar;
  wherein said decoupling member comprises a base portion structured to capture the restraint and to decouple the restraint from the railcar, said base portion having a generally C-shaped configuration that defines a channel structured to capture the restraint, wherein said generally C-shaped configuration extends laterally away from said axis of said elongate member, and wherein said channel defines a plane that is substantially perpendicular to said axis of said elongate member.

2. An apparatus as recited in claim 1 wherein said decoupling member is structured to support the restraint after the restraint is decoupled from the railcar.

3. An apparatus as recited in claim 1 wherein said decoupling member is attached to said first end of said elongate member.

4. An apparatus as recited in claim 3 further comprising a handle, said handle being attached to said second end of said elongate member.

5. An apparatus as recited in claim 1 wherein said decoupling member comprises a support portion being structured to support the restraint once the restraint is decoupled from the railcar.

6. An apparatus as recited in claim 5, wherein said support portion defines an axis that is substantially perpendicular to said axis of said elongate member.

7. An apparatus as recited in claim 1, wherein said base portion comprises first and second flanges and a lateral section extending between said first and second flanges defining said generally C-shaped configuration.

8. An apparatus as recited in claim 7, wherein said decoupling member comprises a support portion being structured to support the restraint once the restraint is decoupled from the railcar, and wherein said support portion comprises a flange attached to and extending from one of said first and second flanges of said base portion.

9. A system for decoupling a restraint from a railcar, comprising:
  a decoupler apparatus, comprising:
  an elongate member having first and second ends and defining an axis therebetween;
  a decoupling member attached to said elongate member, said decoupling member being structured to decouple the restraint from the railcar, wherein said decoupling member comprises a base portion structured to capture the restraint and to decouple the restraint from the railcar, said base portion having a generally C-shaped configuration that defines a channel structured to capture the restraint, wherein said generally C-shaped configuration extends laterally away from said axis of said elongate member, and wherein said channel defines a plane that is substantially perpendicular to said axis of said elongate member; and
  a lifting device structured to position said decoupler apparatus adjacent to the restraint.

10. A system as recited in claim 9 wherein said decoupling member is structured to support the restraint after the restraint is decoupled from the railcar.

11. A system as recited in claim 9 wherein said decoupling member is attached to said first end of said elongate member.

12. A system as recited in claim 11 further comprising a handle, said handle being attached to said second end of said elongate member.

13. A system as recited in claim 9 wherein said decoupling member comprises a support portion being structured to support the restraint once the restraint is decoupled from the railcar.

14. A system as recited in claim 13, wherein said support portion defines an axis that is substantially perpendicular to said axis of said elongate member.

15. A system as recited in claim 9, wherein said base portion comprises first and second flanges and a lateral section extending between said first and second flanges defining said generally C-shaped configuration.

16. A system as recited in claim 15, wherein said decoupling member comprises a support portion being structured to support the restraint once the restraint is decoupled from the railcar, and wherein said support portion comprises a flange attached to and extending from one of said first and second flanges of said base portion.

17. A method for decoupling a restraint from a railcar, comprising:
  providing a decoupler apparatus having an elongate member and a decoupling member attached thereto, the elongate member having first and second ends and defining an axis therebetween, the decoupling member comprising a base portion having a generally C-shaped configuration that defines a channel, wherein said generally C-shaped configuration extends laterally away from said axis of said elongate member, and wherein the channel defines a plane that is substantially perpendicular to the axis of the elongate member;
  positioning the decoupling member adjacent the restraint; and
  decoupling the restraint from the railcar using the decoupling member of the decoupler apparatus, wherein said decoupling step comprises:
  capturing at least a portion of the restraint with the base portion of the decoupling member; and
  thrusting the base portion of the decoupling member against at least a portion of the restraint.

18. A method as recited in claim 17 wherein said positioning step comprises:
  positioning a lifting device adjacent the railcar; and
  lifting the decoupler apparatus using the lifting device.

19. A method as recited in claim 18 wherein said positioning step further comprises moving the lifting device along the side of the railcar.

20. A method as recited in claim 17 wherein said decoupling step comprises supporting the restraint with a support portion of the decoupling member.

* * * * *